L. H. BRINKMAN.
METHOD OF MAKING CURVED WROUGHT METAL PIPE FITTINGS.
APPLICATION FILED JAN. 12, 1906.
953,253.  Patented Mar. 29, 1910.
3 SHEETS—SHEET 1.
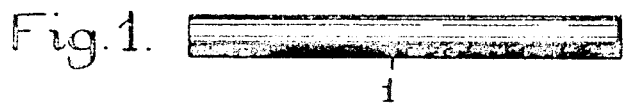
Fig. 1.
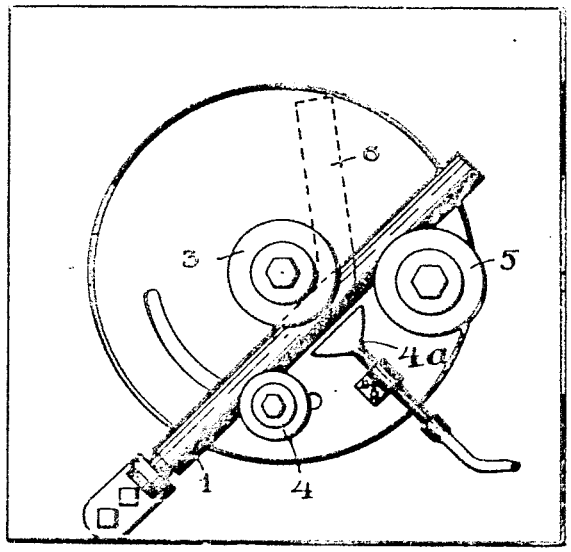
Fig. 2.
Fig. 3.
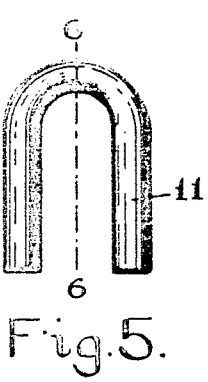
Fig. 5.
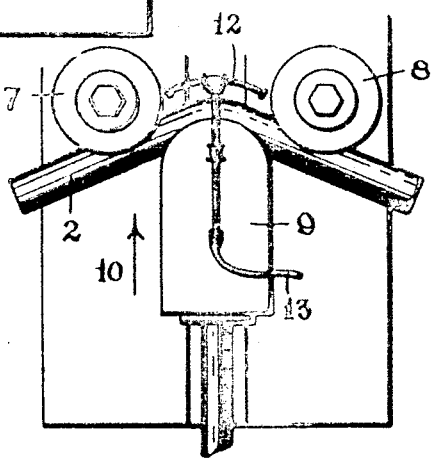
Fig. 4.
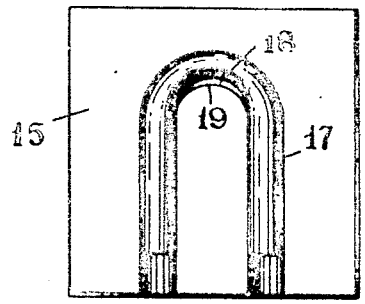
Fig. 7.
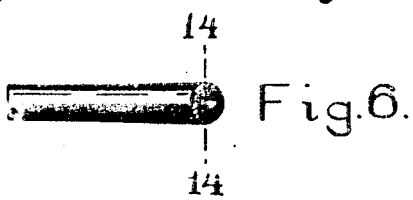
Fig. 6.
Fig. 8.
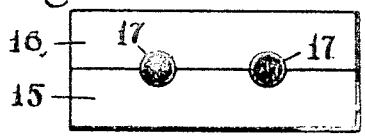
Witnesses
Roy D. Tolman.
Penelope Leimberbach
Inventor
Louis H. Brinkman
By Rufus B. Fowler
Attorney

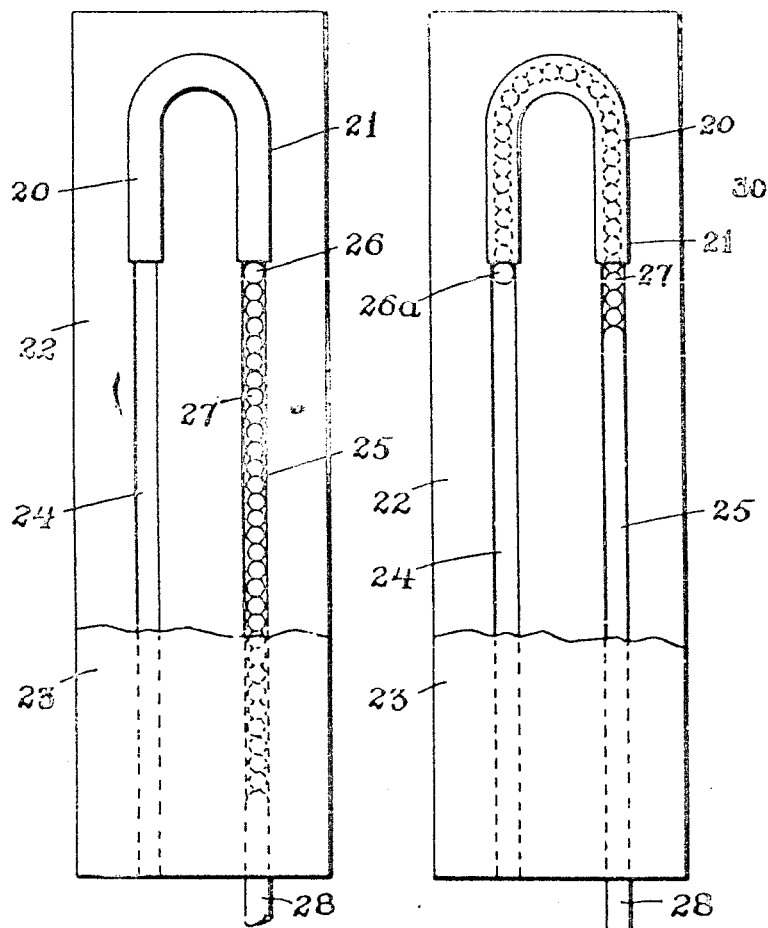
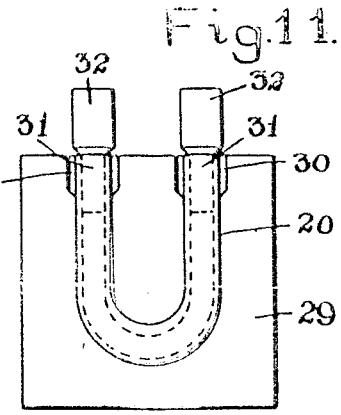
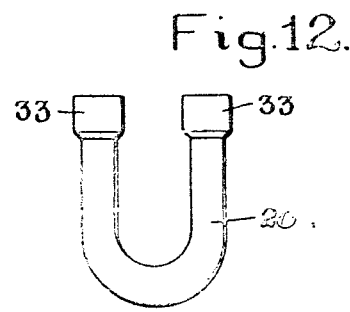
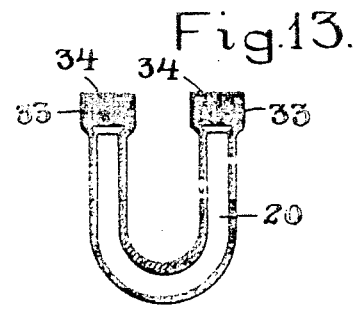
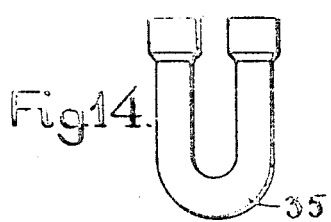
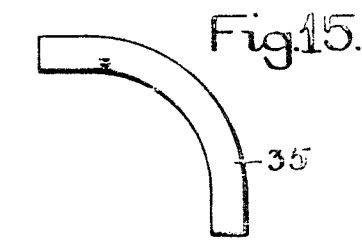
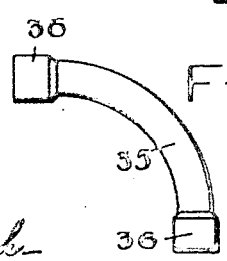

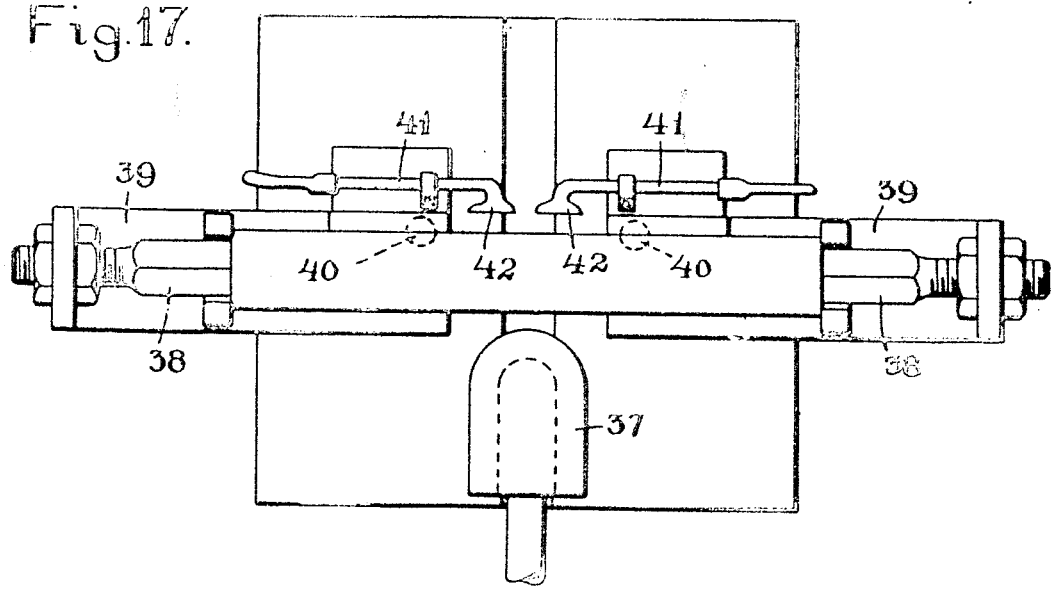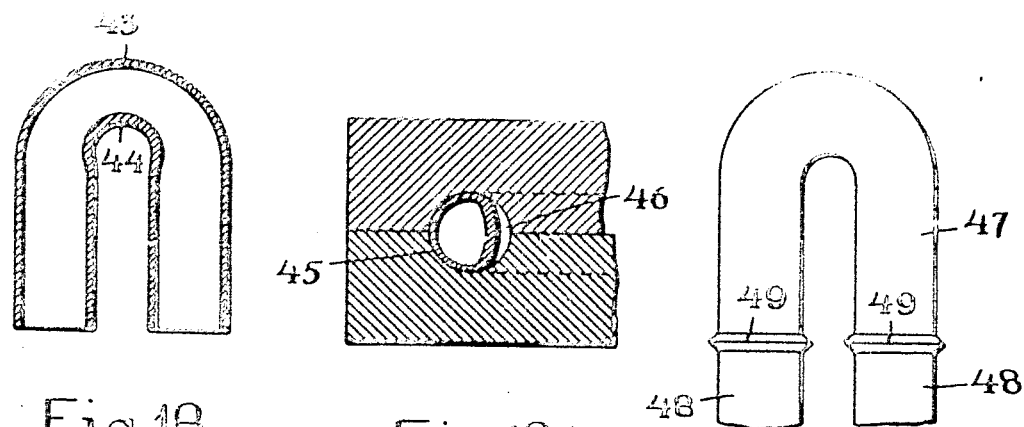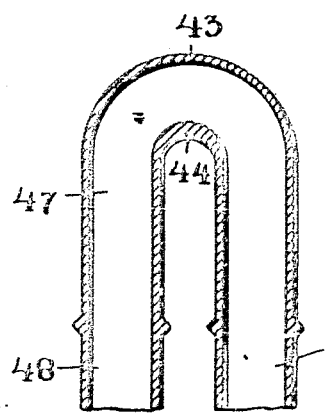

UNITED STATES PATENT OFFICE.

LOUIS H. BRINKMAN, OF HARTFORD, CONNECTICUT, ASSIGNOR TO WHITLOCK COIL PIPE COMPANY, OF WEST HARTFORD, CONNECTICUT, A CORPORATION OF CONNECTICUT.

METHOD OF MAKING CURVED WROUGHT-METAL PIPE-FITTINGS.

953,253.  Specification of Letters Patent.  Patented Mar. 29, 1910.

Application filed January 12, 1906. Serial No. 295,710.

*To all whom it may concern:*

Be it known that I, LOUIS H. BRINKMAN, a citizen of the United States, residing at Hartford, in the county of Hartford and State of Connecticut, have invented a new and useful Improvement in Methods of Making Curved Wrought-Metal Pipe-Fittings, of which the following is a specification, accompanied by drawings forming a part of the same, in which—

Figure 1 represents a straight piece of pipe from which my improved fitting is made. Fig. 2 illustrates the first step in the process of bending. Fig. 3 represents the bent pipe. Fig. 4 represents the process of cooling the convex side of the pipe completing the bending operation. Fig. 5 represents the pipe as bent by the operation illustrated in Fig. 4. Fig. 6 is a sectional view of the bent pipe on line 6—6, Fig. 5. Fig. 7 is a plan view of one of the compressing dies for restoring the contour of the pipe. Fig. 8 is a side elevation of the compressing dies. Figs. 9 and 10 illustrate the method of perfecting the cylindrical contour of the pipe throughout its bent section. Fig. 11 illustrates the method of expanding the screw threaded flanges at the ends of the bent pipe. Fig. 12 represents a completed pipe fitting known as a return bend. Fig. 13 is a central sectional view of the completed fitting. Fig. 14 represents a return bend having a curvature of less radius than that shown in Fig. 12, the radius of curvature at its bent section being considerably less than the diameter of the pipe. Fig. 15 represents a pipe bent to form an elbow, and Fig. 16 represents a completed elbow. Fig. 17 is a top view of a modified bending apparatus. Fig. 18 is a sectional view of a return bend. Fig. 19 is a sectional view of the holding dies, and Figs. 20 and 21 represent a completed return bend.

Similar reference letters and figures refer to similar parts in the different views.

My present invention relates to a new and improved process of making curved pipe fittings, such, for example, as elbows and return bends of wrought metal, and the object of my invention is to increase the strength, decrease the weight, and reduce the expense of this class of fittings which are, at present, formed of cast metal, and it consists in shaping the pipe fittings from wrought metal as hereinafter described and pointed out in the annexed claims.

In carrying my present invention into practice I first cut from a wrought metal pipe of the requisite diameter, either of iron or steel, a piece of suitable length to form the desired fitting, said piece being represented at 1, Fig. 1. I next heat the piece of pipe 1 and bend it at its central section to form an obtuse angle as represented at 2, Fig. 3, the operation of bending being carried out by any suitable apparatus, such, for example, as that represented in plan view in Fig. 2, in which the piece of pipe 1 is held with its center bearing against a roll 3 and its opposite side nearer its fixed end resting against a roll 4. Opposite to the roll 3 is a water pipe 4ª by means of which a spray of cooling water is directed against the convex side of the bending pipe. A bending strain is exerted upon the pipe 1 by the rotation of the roll 5 around the roll 3, and the free end of the pipe is bent into the position shown by the broken lines 6. The pipe bent, as shown at 2, Fig. 3, is then placed against the fixed rolls 7 and 8 and a reciprocating former 9 is moved in the direction of the arrow 10 to crowd the pipe between the rolls 7 and 8 and cause it to be bent around the former 9 into the U-shape, shown at 11, in Fig. 5.

Previous to, and during the bending operation illustrated in Fig. 4, the back or convex side of the pipe 2 is cooled by a spray of water directed against the pipe by a water pipe 12 provided with minute holes arranged to direct a multiplicity of streams against the convex side of the heated pipe, said water pipe being furnished from any source of water supply through a flexible pipe 13.

The operation of bending the pipe into a U-shape shown in Fig. 5, tends to contract the pipe on the line 6—6, Fig. 5, making the cross section of the pipe on line 6—6, less than the normal diameter of the pipe before bending, and at the same time to increase the diameter of the pipe on the broken line 14—14, Fig. 6. This shape of the pipe is a result of applying the entire effective bending strain to the concave side of the bend. I accomplish this by the difference in temperature between the two sides of the pipe at the bending point, for, as the convex side is cool and the concave side hot, the bending strain will compress, as shown in Figs. 6 and 18, the inside of the bend which is in a more or less plastic condition before the fibers of the outside of the bend are stretched; in other words the pipe is bent upon the cool outside as a fulcrum and all the distortion of the pipe will occur upon the inside of the bend. The wall of the pipe, therefore, whatever the radius of the bend, will not be made thinner by stretching upon the convex side of the bend, but the only result will be to thicken the wall of the pipe upon the inside of the bend. It only remains then to restore the original circular shape and diameter to the inside of the pipe at the bend by reforming the wall of the pipe at the concave side of the bend, while the pipe is still plastic, see Figs. 13 and 21. I accomplish this as follows:— The pipe bent as shown in Fig. 5 is compressed between a pair of dies 15 and 16, said dies being provided with a recess 17 which is circular in its crosssection throughout its entire length, and having a diameter equal to the outside diameter of the bent pipe. Owing to the contraction of the pipe at its bent section, a space 18 will be left between the bent portion of the pipe and the side 19 of the recess in the dies, and the object of compressing the pipe between the dies 15 and 16 is to restore the cylindrical form of the pipe at its bent section by compression between the dies which reduces the diameter on line 14—14, Fig. 6, and expands the pipe laterally to fill the space 18, thereby restoring the circular contour of the pipe, as shown at 20, Figs. 9 and 10. After the circular contour of the pipe has been restored by compression between the dies 15 and 16, I next force a series of balls through the pipe, as shown in Figs. 9 and 10, by placing the U-shaped pipe 20 in a recess 21 formed between die plates 22 and 23, said die plates having longitudinal channels 24 and 25 in which, first, a ball 26 is placed as shown in Fig. 9, whose diameter is equal to the interior diameter of the bent pipe. The pilot ball 26 is followed by a series of slightly smaller balls 27 which are pushed forward by a follower 28, causing the pilot ball 26 to be forced through the pipe 20 into the position shown at 26ª, Fig. 10. As the following balls 27 are slightly smaller than the pilot ball 26, as soon as the pilot ball arrives at the position shown at 26ª, Fig. 10, the bent pipe can be withdrawn and the smaller balls removed. The bent pipe 20 is then held between a pair of duplicate die plates, one of which is shown at 29, Fig. 11, provided with enlarged recesses at the ends of the pipe to form annular spaces 30 around each end of the pipe. The ends 31 of the pipe are then expanded by means of dies 32 which are forced into the ends of the pipe, thereby expanding it to fill the annular space 30 and forming on each end of the pipe the expanded flanges 33, as shown in Figs. 12 and 13. The flanges 33 are then provided with internal screw threads 34 and the return bend is completed.

In the manufacture of elbows the straight piece of pipe can be bent sufficiently at a single operation, such as that illustrated in Fig. 2 to form the desired curvature for the elbow, as shown at 35, Fig. 15, and the ends of the elbow are then expanded to form flanges 36, 36, to receive an internal screw thread, as shown in Fig. 16.

I am aware that wrought metal pipe has heretofore been bent and returned upon itself by a curvature of 180°, thus forming in the pipe a return bend which is a part of, and integral with the pipe itself. This method of bending pipe has been possible where the radius of curvature was largely in excess of the diameter of the pipe. An attempt to bend a wrought metal pipe upon a small radius, such, for example, as one approximately the diameter of the pipe or less, not only produces a crimping of the concave side of the bent pipe due to the process of upsetting, but it also stretches the outer or convex side of the bent pipe and reduces its thickness, thereby weakening the pipe.

By my improved process I am able to bend pipe upon a curvature of very small radius or less than the diameter of the pipe, and I also prevent the stretching of the outer or convex side of the bent pipe, thereby preserving the original thickness and strength of the pipe. Return bends and elbows constructed by my improved process can be manufactured at the cost substantially of cast metal fittings, and they are much lighter in weight, as well as stronger, and as the flanges possess greater tensile strength the liability of checking or splitting the flanges in applying the fittings to pipe, which is a common defect of cast metal fittings, is thereby avoided. It is sometimes sought to increase the tensile strength of cast metal fittings by forming the fittings of annealed or malleable iron, which not only adds to the expense of the fittings, but renders them liable to distortion of their flanges in the process of annealing. By my method of expanding the flanges they are rendered absolutely cylindrical and concentric with the pipe.

So far as I am aware, wrought metal fittings of iron or steel, manufactured from straight pieces of piping, are an entirely new article of manufacture in the art of pipe fittings.

In Fig. 14 I have shown a completed return bend 35 having the radius of its curvature less than the diameter of the pipe, and in the manufacture of a return bend of such small radius, the abruptness of the bend not only tends to stretch the convex side of the pipe and decrease its strength, but it also tends to crimp the concave side of the pipe by upsetting, producing wrinkles in the pipe. These defects are counteracted by my method of making.

In Fig. 17 I have shown a method of bending a return bend at one operation by the use of a sliding former 37, and a pair of mandrels 38, 38, held by plates 39, 39, which are capable of swinging about axes indicated by the broken lines 40, 40. The cooling of the pipe is accomplished by water jets which are supplied through pipes 41, 41, having flattened nozzles 42, 42.

The sectional view in Fig. 18 shows the effect upon the metal caused by the bending and cooling of the outer or convex side. As shown in Fig. 18, the normal thickness of the pipe is maintained at its outer or convex side at 43, while the entire strain upon the pipe results in a thickening or upsetting of the inner or concave side of the pipe at 44. The section shown in Fig. 18 represents the condition of the bent pipe, after it has been compressed between the dies 15 and 16 but before the pilot ball 26 has been forced through the pipe, which restores the interior diameter of the pipe. The action of the ball 26 in its passage through the pipe expands the inner or concave side 44, for the reason that the outer or convex side is held against the dies as shown at 45, Fig. 19, while the space 46 between the dies and the inner or concave side of the pipe, and in addition, the outer side of the pipe has been caused to resist expansion, while the inner or concave side is still hot and ductile.

Fig. 20 shows a return bend 47 which is not provided with the expanded flanges 33, Fig. 15, but has its ends welded to the ends of pipes 48, 48. The longitudinal compression of the welded ends causes an exterior rib or annular projection 49. The welding may be accomplished by electricity or other convenient method.

Fig. 21 shows in sectional view the return bend 47 having its ends welded to the pipes 48, 48, and having its interior diameter restored to the normal diameter of the pipe before bending, and with the excess of metal crowded into the concave side of the bend producing a thickening of the pipe, as at 44.

What I claim as my invention and desire to secure by Letters Patent is:—

1. The within described method of bending pipe, comprising heating the pipe to be bent, exerting a bending strain upon said pipe, and cooling the outer or convex side of the bend during the application of the bending strain.

2. The within described method of bending pipe, comprising applying a bending strain to said pipe, with the outer or convex side of the bend cooler than the inner or concave side of the bend, whereby the pipe on the inner side of the bend will be upset by the bending strain before the pipe on the outer side of the bend is stretched.

3. The within described method of bending straight pieces of pipe, comprising cooling the pipe during the bending process on the convex or outer side of the bend sufficiently below the temperature of the concave or inner side of the bend so that the pipe on said concave side may be compressed without elongation of said convex side by the bending strain.

4. The within described method of bending pipe, comprising applying a bending strain to a pipe, with said pipe on the convex side of the bend sufficiently cooler than on the concave side of the bend so that the bending strain will thicken said concave side without changing said convex side, then restoring the circular contour and original diameter of the bent section of the pipe.

5. The within described method of bending pipe, comprising applying a bending strain to a piece of pipe of which the side forming the inner or concave bend is at a higher temperature than the outer or convex bend so that the shape of said pipe will be distorted by the bending strain upon said inner or concave bend before the convex or outer bend is stretched, and restoring after the bending process the distorted inner or concave bend to its original shape and diameter.

6. The within described method of bending a piece of metal pipe, comprising exerting a bending strain upon the heated pipe, cooling during the bending process the convex or outer side of the bend, and restoring the interior of the bent section of the pipe to its original circular contour.

7. The within described method of bending metal pipe, comprising heating a piece of pipe, exerting a bending strain upon the heated portion and at the same time cooling the convex or outer side of the bending pipe, whereby the interior or concave side of the pipe is upset and the outer or convex side is not disturbed by the bending process, and restoring the interior of the pipe to its original circular contour.

8. The method of making curved wrought metal pipe fittings, comprising heating a piece of pipe, bending the pipe to form an obtuse angle, cooling the outer or convex surface of the pipe, continuing the bending to form a U-shaped piece, compressing the bent section between dies having recesses corresponding to the normal outer diameter of the pipe, and forcing a ball through the bent pipe, having a diameter equal to the normal inner diameter of the pipe.

9. The within described method of making curved pipe fittings consisting in heating a straight piece of pipe of the desired diameter of the pipe fitting, bending the heated piece to form an obtuse angle, cooling the outer or convex portion of the bent section, bending to a U-shape, compressing the bent section to restore the circular contour of the bent section and expanding the bent section by interior pressure, expanding the ends of the pipe to form flanges to receive a screw thread.

10. The within described method of bending pipe, comprising exerting a bending strain upon a heated pipe, applying a cooling liquid to the outer or convex side of the bend during a bending process, whereby only the inner or concave bend of said pipe will be distorted by the bending strain, and restoring after the bending process the distorted concave side of the pipe to its original circular contour.

Dated this 27th day of December 1905.

LOUIS H. BRINKMAN.

Witnesses:
ARTHUR T. HYDE,
JOSEPH E. LEWIS.